United States Patent [19]

Rich et al.

[11] Patent Number: 4,959,407
[45] Date of Patent: Sep. 25, 1990

[54] RTV SILICONES HAVING BIS(UREIDO)SILANE CHAIN EXTENDERS AND AMINOXY SILOXANE CROSSLINKERS

[75] Inventors: Jonathan D. Rich, Rexford; David C. Gross; Timothy B. Burnell, both of Schenectady; Jeffrey H. Wengrovius, Scotia, all of N.Y.

[73] Assignee: General Electric Company, Schenectady, N.Y.

[21] Appl. No.: 359,818

[22] Filed: Jun. 1, 1989

[51] Int. Cl.$^5$ .................................................. C08K 3/26
[52] U.S. Cl. .................................... 524/425; 524/788; 528/33; 528/34; 528/40; 528/41
[58] Field of Search ................... 528/33, 34, 40, 41; 524/425, 788

[56] References Cited

U.S. PATENT DOCUMENTS

| | | | |
|---|---|---|---|
| 3,766,127 | 10/1973 | Clark et al. | 260/37 |
| 3,817,909 | 6/1974 | Toporcer et al. | 260/37 |
| 3,996,184 | 12/1976 | Klosowski | 260/32.6 |
| 4,528,353 | 7/1985 | Lucas et al. | 528/21 |

Primary Examiner—Melvyn I. Marquis
Attorney, Agent, or Firm—William A. Teoli; James C. Davis, Jr.; William H. Pittman

[57] ABSTRACT

A moisture curable solventless organopolysiloxane composition is provided useful as an adherent construction sealant. Improved cure rate, higher elongation at break values and lower modulus RTVs are achieved by using a bis(ureido)silane as a coupler and an aminoxysiloxane as a crosslinker for a silanol-terminated polydiorganosiloxane base polymer.

21 Claims, No Drawings

RTV SILICONES HAVING BIS(UREIDO)SILANE CHAIN EXTENDERS AND AMINOXY SILOXANE CROSSLINKERS

BACKGROUND OF THE INVENTION

The present invention relates to moisture curable room temperature vulcanizable (RTV) organopolysiloxane compositions utilizing a mixture of a bis(ureido) silane coupler and an aminoxy silane crosslinker for a silanol-terminated polydiorganosiloxane base polymer.

Prior to the present invention as shown by Klosowski, U.S. Pat. No. 3,996,184, vulcanizable silicone elastomers were provided using a mixture of a bis(N-organoacetamido)silane and a tris(aminoxy)silane to convert a hydroxy endblocked polydimethylsiloxane to a silicone elastomer. The compositions of Klosowski also contain a solvent, such as N,N-dimethylformamide, as well as up to 200 parts of a non-reinforcing filler, per 100 parts by weight of the silanol-terminated polydiorganosiloxane. Additional room temperature vulcanizable organopolysiloxane compositions using a dual catalyst system are shown by Goossens U.S. Pat. No. 3,338,868, Clark et al. U.S. Pat. No. 3,766,127, and Toporcer et al. U.S. Pat. No. 3,817,909.

Although the aforementioned moisture curable room temperature vulcanizable organopolysiloxane compositions provide valuable silicone elastomers useful in various construction applications, an enhancement in the cure rate, improvement in ultimate elongation and reduction in the modulus of these elastomers are desirable. In addition, many of such applications cannot tolerate an organic solvent, such as N,N-dimethylformamide, or acetonitrile

SUMMARY OF THE INVENTION

The present invention is based on the discovery that a fast, moisture curable, room temperature, vulcanizable organopolysiloxane composition useful as an adherent construction sealant can be made free of organic solvent by utilizing a blend of a bis(ureido)organosilicon coupler as defined hereinafter and a poly(aminoxy)-siloxane crosslinker in combination with a silanol-terminated polydiorganosiloxane. The resulting RTV composition can be filled with a blend of ground calcium carbonate and precipitated calcium carbonate, as a non-reinforcing filler, to give a thixotropic sealant.

STATEMENT OF THE INVENTION

There is provided by the present invention, solventless, moisture curable, room temperature vulcanizable organopolysiloxane composition comprising by weight, (A) 100 parts of a silanol-terminated polydiorganosiloxane, (B) 2.5 to 25 parts of a bis(ureido)diorganosilicon coupler selected from diorganosilanes and ureido-chain-stopped polydiorganosiloxanes having an average of from 1 to 10 condensed diorganosiloxy units, (C) 0.25 to 10 parts of an aminoxyorganosiloxane selected from the class consisting of a cyclic siloxane, linear siloxane, or a mixture thereof having from 2 to about 100 silicon atoms substituted with $C_{(1-13)}$ monovalent organic radicals and from 3 to about 10-OY radicals attached to silicon by silicon-oxygen linkages, where there are less than 3 OY-radicals per silicon atom, Y is a monovalent amine radical selected from the class consisting of —$N(R)_2$ and a heterocyclic amine, and R is selected from the same or different $C_{(1-13)}$ monovalent organic radicals, and (D) up to 400 parts of a non-siliceous filler and preferably 5 to 200 parts comprising a mixture of ground calcium carbonate and 10% to 100% by weight thereof of precipitated calcium carbonate.

Included within the silanol-terminated polydiorganosiloxane which can be used to make the room temperature, vulcanizable organopolysiloxane composition, are polydiorganosiloxane included within the following formula:

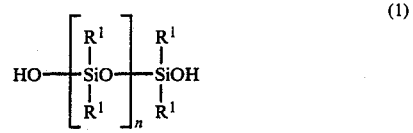

where $R^1$ is selected from the same or different $C_{(1-13)}$ monovalent hydrocarbon radicals, or $C_{(1-13)}$ monovalent hydrocarbon radicals substituted with monovalent radicals inert during equilibration, and preferably methyl, or a mixture of a major amount of methyl and a minor amount of a member selected from the class consisting of phenyl, cyanoethyl, trifluoropropyl, vinyl, and mixtures thereof, and n has a value of from about 50 to about 2500. Preferably, the silanol-terminated polydiorganosiloxane of the present invention has a viscosity in the range of from 1,000 to 100,000 centipoise at 25° C.

Ureido silanes which can be used as couplers for the above described silanol-terminated polydiorganosiloxanes in the practice of the present invention are compounds included within the following formula,

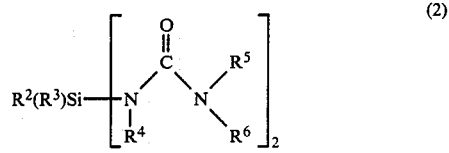

where $R^2$, $R^3$, $R^4$, $R^5$ and $R^6$ are selected from the same or different $C_{(1-13)}$ monovalent organo radicals.

Radicals included within R, and $R^1$ of formula (1), and $R^2$-$R^6$ formula (2) are for example $C_{(1-8)}$ alkyl radicals, such as methyl, ethyl, propyl, butyl, pentyl, hexyl, heptyl,; alkenyl radicals, such as vinyl, propenyl; cycloaliphatic radicals, such as cyclobutyl, cyclopentyl, cyclohexyl,; $C_{(6-13)}$ aromatic hydrocarbon radicals, such as phenyl, tolyl, xylyl, and chlorinated derivatives of such $C_{(1-13)}$ aromatic hydrocarbon radicals such as chlorophenyl, bromotolyl. $R^5$ and $R^6$ of formula (2) also can be combined to form a $C_{(4-8)}$ cycloaliphatic radical.

Ureido-chain-stopped polydiorganosiloxanes which can be used as couplers in the practice of the invention are included within the following formula,

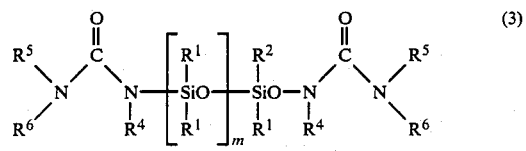

where $R^1$, $R^4$, $R^5$ and $R^6$ are as previously defined, and m is an integer having a value of 1 to about 10 inclusive.

The non siliceous fillers which can be used in the practice of the invention are, for example, ground calcium carbonate which is manufactured mechanically by dry or wet grinding of raw materials, such as weathered marine shells, chalk, sugar-calcite, and marble. In addition, there can be used higher surface area, smaller particle size precipitated calcium carbonate, as a filler, which can be prepared from the reaction of $Ca(OH)_2$ with $CO_2$, or an alkali carbonate, such as ammonium or sodium carbonate. It can have a BET surface area of 10 to 400 m$^2$/g and maximum probability pore size of about 101 to 1 micron.

The ureido silanes of formula (2) can be made by initially forming a bis(amino)diorganosilane which is thereafter reacted with an appropriate organoisocyanate. One method of making the intermediate bis(amino)diorganosilane is by reacting a diorganodichlorosilane, such as dimethyldichlorosilane, with 4 molar equivalents of a secondary amine, such as pyrrolidine, to produce the corresponding bis(amino)dimethylsilane. The amine salt can be separated by filtration. The resulting dimethylbisaminosilane then can be recovered by removing the solvent under reduced pressure.

Alternatively, amine terminated dimethylsiloxane oligomers can be prepared by the reaction of 2 molar equivalents of a secondary amine, such as pyrrolidine, with an SiH terminated dimethylsiloxane oligomer, such as 1,1,3,3-tetramethyldisiloxane, in the presence of a suitable metal catalyst, for example, platinum. This synthetic route gives $H_2$ gas as a by-product thus eliminating the intensive filtration step.

As previously indicated, the corresponding bis(uriedo)silane coupler can be obtained by effecting reaction between the diorganobis(amino)silane and appropriate organoisocyanate by initially contacting the diorganobisaminosilane and the organic isocyanate at reduced temperatures with stir ring, such as 0° C.-25 C., and then allowing the mixture to warm to room temperature with sufficient agitation.

A related reaction of the α,β-diaminopolydimethyl siloxane oligomer with two equivalents of an organoisocyanate also gives a bis(ureido)siloxane coupler.

The ureido-chain-stopped polydiorganosiloxanes can be made by initially forming an amine terminated polydiorganosiloxane and thereafter reacting it with an appropriate organoisocyanate. The amine terminated polydiorganosiloxane can be made by effecting reaction between a hydrogen terminated polydiorganosiloxane and the appropriate amine in the presence of a platinum catalyst. Suitable platinum catalysts are discussed by Karstedt, U.S. Pat. No. 3,775,452 incorporated herein by reference.

An alternative procedure for making the ureido-chain-stopped polydiorganosiloxanes is by effecting contact between an excess of ureido silane of formula (2) and silanol terminated polydiorganosiloxane having up to about 100 condensed units such as a polydimethylsiloxane.

The aminoxyorganosiloxane crosslinkers can be prepared in accordance with the procedure shown by Murphy, U.S. Pat. No. 3,441,583, which is incorporated herein by reference. For example, the aminoxyorganosiloxane crosslinkers can be made by effecting reaction between a hydroxyamine and a silicon hydride, for example, a cyclic or linear hydroxide siloxane having a mixture of hydrogen atoms and $C_{(1-13)}$ organo radicals, for example, R; radicals of formula (1) attached to silicon. A typical mechanism is shown as follows:

$$YOH + HSi\equiv \rightarrow YOSi\equiv + H_2,$$

where Y is a monovalent amine radical selected from $-N(R)_2$ as previously defined, and a $C_{(4-8)}$ heterocyclic amine radical, derived from a heterocyclic hydroxylamine, such as N-hydroxypyrrolidine, N-hydroxyethyleneamine, N-hydroxypiperdine, and N-hydroxymorpholine.

In the practice of the invention, one package RTV organopolysiloxane compositions preferably are prepared by blending under substantially anhydrous conditions, the silanol-terminated polydiorganosiloxane with the non-siliceous filler in the form of a ground calcium carbonate, precipitated calcium carbonate or a mixture thereof. Batchwise blending can be done in a high shear mixer, followed by devolatilizing the ingredients to produce a base mixture. A solution of the bis(ureido)silane and aminoxyorganosiloxane then can be added to the base mixture with stirring.

Alternatively, the uncured elastomer can be manufactured continuously under substantially anhydrous conditions, by blending silanol polymer, $CaCO_3$ filler, bis(ureido)silane coupler, and aminoxysiloxane crosslinker on a turn screw extruder. The resulting room temperature vulcanizable mixture can thereafter be stored under substantially anhydrous conditions at a temperature in the range of from −20° C. to 35° C. for extended shelf periods, such as 6 months or more. As used hereinafter, the expression "moisture-free conditions" or "substantially anhydrous conditions" means mixing in a dry box, or in a closed container which has been subjected to a vacuum to remove air and replaced with a dry inert gas such as nitrogen.

The room temperature vulcanizable composition of the present invention also can contain non-acidic, non-rein forcing fillers, in addition to the aforementioned calcium carbonate, such as ferric oxide, non-acidic carbon black, diatomaceous earth, alumina, hydrated alumina, titanium dioxide, glass microspheres, organic fillers, course quartz, or calcium sulfate. Reinforcing fillers, such as fumed silica, may also be employed.

Additional additives which can be incorporated into the mixture are adhesion promoters such as (3-gylcidoxypropyl)trimethoxysilane, 3-aminopropyltrimethoxysilane,
3-aminoethyltriethoxysilane,
N-(2-aminoethyl-3-aminopropyl)-trimethoxysilane,
1,3,5-tris(3-trimethoxysilylpropyl)isocyanurate, etc.

The RTV compositions of this invention when cured provide elastomers having high elongation, such as, greater than 800%. Elongation values of 1000 to 2000% are not unusual with a modulus at 150% elongation of less than 90 pounds per square inch (p.s.i.). These low modulus silicone elastomers find utility in building construction, such as in sealing joints wherein the building materials sealed by these elastomers can expand and contract without breaking the seal. The low modulus silicone elastomers of this invention also have unprimed adhesion to variety of substrates. The RTV compositions of this invention also have a rapid skin over time which helps to keep the sealing material clean because it skins over rapidly. As a result, surface dirt, which would ordinarily adhere to a tacky surface, is avoided.

In order that those skilled in the art will be better able to practice the invention, the following examples are given by way of illustration and not by way of limitation. All parts are by weight, unless otherwise indicated. In addition, all reactions in the following examples were carried out under anhydrous nitrogen at about 0° C.

EXAMPLE 1

Over a 1.5 hour period, 145 grams (1.03 mol) of methylvinyldichlorosilane was added with stirring to a mixture under nitrogen at 0.C of 1 L of dry hexane and 293 grams (4.12 mols) of pyrrolidine. The resulting mixture was allowed to stir for about 12 hours while warming to room temperature. A solid white precipitate was filtered and washed with dry hexane under nitrogen. The solvent was removed under reduced pressure and the product was distilled giving 158 grams (73% yield) of bis(pyrrolidinyl)methylvinylsilane, having a boiling point of 50°-52° C. at less than 1 torr. There was added dropwise to 28.4 grams (135 millimoles) of bis(pyrrolidinyl) methylvinylsilane, which was stirring under nitrogen at 0° C., 26.7 grams (270 millimoles) of butylisocyanate. The reaction was stirred at 0° C. for a period of 12 hours. The mixture was then allowed to warm to room temperature over a 60 minute period. There was obtained a quantitative yield of bis(1,1-tetramethylene-3-butylureidomethylvinylsilane in the form of a clear viscous oil. Its identity was confirmed by IR and NMR. It is referred to hereinafter as the "bis(uriedo) coupler".

1.5 moles of 1,3,5,7-tetramethylcyclotetrasiloxane (361 g) was added, under N$_2$, to 500 ml of distilled toluene in a 2 liter, 3-necked round-bottom flask equipped with an overhead stirrer. The solution was heated to 50° C. and 0.075 g of a 5 weight percent platinum solution of

$$Pt_2[((CH_2=CH)(CH_3)_2Si)_2O]_3$$

in xylene was added. A cylinder of 1-butene (100 g) was heated in a hot water) bath and the gas was fed into the flask over 4 hours time at a rate sufficient to maintain a 60°-80° C. reaction temperature. Triphenylphosphine (1 g) was added to the reaction prior to the isolation of 1-butyl-1,3,5,7-tetramethylcyclotetrasiloxane by fractional distillation (87°-93° C. @ 10-14 mm Hg).

Distilled (CH3CH$_2$)$_2$ NOH (89.3 g, 1 mole) was added over 15 hours time to 1-butyl-1,3,5,7-tetramethylcyclotetrasiloxane (95.3 g, 0.32 moles) at 0° C. The reaction mixture was heated to 40° C. for 4 hours at which time excess (CH$_3$CH$_2$)$_2$ NOH was removed under vacuum (0.10 mm Hg) to afford a quantitative yield of 1-butyl-3,5,7-tris-(diethylhydroxylamino)-1,3,5,7-tetramethylcyclotetrasiloxane. Its identity was confirmed by $^{29}$Si and 1H NMR. It is referred to hereinafter as the "aminoxy-crosslinker".

An RTV base mixture was prepared by compounding in a Baker-Perkins mixer, 1600 grams of a silanol-terminated polydimethylsiloxane having a viscosity of 22,500 centipoise, and 1200 grams of a precipitated calcium carbonate (BET surface area of 11.5 m$^2$/g, having a maximum probability pore diameter of 0.23 micrometers). The resulting blend was then devolatilized by heating for one hour at 110° C. at about 30 torr. All mixing was performed under substantially anhydrous conditions. The RTV base mixture was subsequently loaded into 6 ounce Semkit tubes (approximately 200 grams each) using a Semco catalyzer.

A room temperature vulcanizable composition was prepared by injecting via a dasher rod, a solution of 7.72 g of the bis(ureido) coupler and 2.12 g of the aminoxysilane crosslinker into 193 g of the above room temperature vulcanizable (RTV) base mixture. The resulting composition was blended by a Semkit mixer.

EXAMPLE 2

Additional room temperature vulcanizable compositions were prepared by blending the RTV base mixture, silanol coupler, and crosslinker of Example 1. RTV 2 was prepared by blending 186 g of the RTV base mixture, 3.95 g of methylvinyl-bis(N-methylacetamido)silane, MeViSi(N(Me)C(O)Me)$_2$, referred to as "bis(acetamido)coupler" and 2.06 g of the aminoxy-crosslinker. RTV 3 was prepared by blending 209 g of the RTV base mixture, 8.34 g of the bis(ureido) coupler, and 1.67 g of the aminoxy-crosslinker. RTV 4 was prepared by blending 198 g of the RTV base mixture, 4.19 g of the bis(acetamido) coupler, and 1.57 g of the aminoxy-crosslinker. RTV 5 was prepared by blending 194 g of the RTV base mixture, 7.83 g of the bis(ureido) coupler and 1.25 g of the aminoxy-crosslinker. RTV 6 was prepared by blending 200 g of the RTV base mixture, 4.23 g of the bis(acetamido) coupler, and 1.24 g of the aminoxycrosslinker. The various RTVs, including example 1 (RTV 1) are shown as follows in Table 1 where the compositions are expressed in parts, per 100 parts of RTV:

TABLE 1

| RTV | 1 | 2 | 3 | 4 | 5 | 6 |
|---|---|---|---|---|---|---|
| Silanol Polymer (22,500 cps) | 54.37 | 55.36 | 54.53 | 55.53 | 54.58 | 55.52 |
| Precipitated Calcium Carbonate | 40.78 | 41.52 | 40.90 | 41.64 | 40.94 | 41.72 |
| bis(acetamido) coupler | | 2.05 | | 2.06 | | 2.06 |
| bis(uriedo) coupler | 3.81 | | 3.81 | | 3.86 | |
| aminoxy-crosslinker | 1.05 | 1.07 | .76 | .77 | .62 | .60 |
| Moles Coupler/moles Crosslinker | 5.0 | 5.0 | 6.9 | 6.9 | 8.6 | 8.9 |
| Tack Free Time | <15 min | 20 min | 11 min | 20 min | | |
| Cure Time (50% Rel. Hum.) | 10 Days | 10 Days | 6 Days | 6 Days | 6 Days | 6 Days |
| ShoreA | 25 | 29 | 20 | 26 | 20 | 26 |
| Tensile (p.s.i.) | 275 | 215 | 248 | 249 | 278 | 228 |
| Elongation (percent) | 977 | 620 | 1147 | 891 | 1344 | 975 |
| Modulus (tensile (psi) @ 50-100-150% elong) | 59-73-80 | 64-80-95 | 43-53-56 | 53-66-76 | 45-42-56 | 50-60-69 |

The physical properties of the RTVs in Table 1 above shows that at the same molar ratio of "coupler" to "crosslinker", 5/1, 6.9/1, and ~~8.75/1, respectively, superior elastomers are obtained in all cases with the bis(ureido)silane. For example, the elongation at break of RTV 1, 977%, is 58% greater than the 620% of RTV 2, 620%. This dramatic improvement in ultimate elongation at break is accompanied by reduced tensile values at 50, 100, and 150% elongation. The tack-free times of RTVs 1 through 4 was measured according to ASTM standard test method C679. In both cases, (RTV 1 versus RTV 2) and (RTV 3 versus RTV 4) the elastomers formulated with the bis(ureido)silanes exhibited faster tack-free times than those containing the bis-(amido)silanes. All RTVs containing the bis(ureido)silane and precipitated CaCO$_3$ were found to be thixotropic (flow values <0.05") without a polar organic solvent.

EXAMPLE 3

Four additional RTVs 7, 8, 9 and 10 were prepared. These RTVs used two different bis(ureido)silane couplers which were prepared following the above procedures. These included; $CH_3(CH_2=CH)Si[N((CH_2)_3CH_3)C(O)N(CH_3)((CH_2)_3CH_3)]_2$, abbreviated MeViSi(N-(Bu)C(O),N(MeBu))$_2$, was prepared from MeViSiCl$_2$, BuNCO, and HN(Bu)Me, and $CH_3(CH_2=CH)Si(N(CH_3)C(O)(N(Me)Bu))_2$, was prepared from MeViSiCl$_2$, MeNCO, and HN(Me)Bu. In addition, a base mixture was prepared following the procedure of Example 1, except that an alternate precipitated calcium carbonate having BET specific surface area of 13.5 m$^2$/g and a maximum probability pore size of 0.12 micrometers was used. The resulting RTVs 7, 8, 9 and 10 were subjected to accelerated heat aging of up to 7 days prior to cure showed only a modest loss of physical properties. The results are shown as follows in Table 2, where the values shown for the RTV ingredients are in parts, per 100 parts of mixture unless otherwise indicated and RTVs 9 and 10 are shown after a shelf period of up to seven days at 70° C. prior to cure:

at 70° C. prior to testing for adhesion. The RTVs were applied onto wire mesh screens resting on either a concrete slab or a glass plate to thickness sufficient to cover the screen. The resulting composites were allowed to cure for 14 days at 50% R.H. Half of the cured composites were then immersed in water for 1 day. Table 3 below shows the compositions of the RTVs, where the values are shown in parts, per 100 parts of mixture:

TABLE 3

| RTV | 11 | 12 |
|---|---|---|
| Silanol Polymer (22,500 cps) | 54.92 | 54.92 |
| Calcium Carbonate | 41.19 | 41.19 |
| MeViSi(N(Bu)C(O)N(MeBu))$_2$ | 3.06 | 3.07 |
| aminoxy-crosslinker | .78 | .78 |
| Iso-T | .05 | |
| Glymo | | .05 |
| Moles Coupler/Moles Crosslinker | 5.00 | 5.01 |

The following peel adhesion results were obtained after 14 days cure at 25° C. and 50% RH:

TABLE 4

| | PSI/% Cohesive Failure | |
|---|---|---|
| RTV | Concrete | Glass |
| 11 | 24/0 | 65/100 |
| 12 | 42/0 | 37/0 |

The following Peel Adhesion results were obtained after 14 days cure at 25 C and 50% RH and 1 day immersion in water:

| | Concrete | Glass |
|---|---|---|
| 11 | 20/0 | 50/100 |
| 12 | 30/0 | 50/50 |

An additional bis(ureido)silane coupler was prepared by adding dropwise, 45.6 g (0.340) moles of tetramethyldisiloxane over a 4 hour period to a 2 molar excess

TABLE 2

| RTV | 7 | 8 | 9 | 9 | 10 | 10 | 10 |
|---|---|---|---|---|---|---|---|
| Silanol Polymer (22,500 cps) | 54.95 | 54.95 | 54.94 | | 54.95 | | |
| (Calcium Carbonate) | 41.21 | 41.21 | 41.21 | | 41.21 | | |
| MeViSi(N(Bu)C(O)N(BuMe))$_2$ | 3.05 | 3.16 | | | | | |
| MeViSi(N(Bu)C(O)N(BuMe))$_2$ | | | 2.99 | | 3.12 | | |
| aminoxy crosslinker | .79 | .68 | .85 | | .73 | | |
| Moles Coupler/moles Crosslinker | 4.91 | 5.93 | 5.55 | | 6.73 | | |
| Time @ 70° C. before Cure | 0 Days | 0 Days | 0 Days | 5 Days | 0 Days | 5 Days | 7 Days |
| Tack Free Time | 1 hour | 1 hour | 1 hour | 50 min | 1 hour | 1 hour | — |
| Cure Time (50% Rel. Hum.) | 11 Days | 13 Days | 11 Days | 7 Days | 13 Days | 7 Days | 7 Days |
| ShoreA | 12 | 5 | 11 | 15 | 9 | 12 | 15 |
| Tensile (p.s.i.) | 224 | 107 | 198 | 180 | 168 | 205 | 172 |
| Elongation (percent) | >1240 | 1377 | 1219 | 981 | 1304 | 1105 | 1077 |
| Modulus (tensile (psi) @ 50-100-150% elong) | 21-25-28 | 14-16-18 | 23-26-29 | 31-36-40 | 18-20-23 | 25-30-33 | 27-31-35 |

The above results show that an increase in the ratio of coupler to crosslinker substantially enhance the elongation at break even after accelerated aging at 70° C. for periods up to 7 days.

EXAMPLE 4

RTVs were prepared in accordance with the procedure of Example 3, utilizing (3-glycidoxypropyl)trimethoxysilane (Glymo), and 1,3,5-tris(3-trimethoxysilylpropyl)isocyanurate (Iso-T) as adhesion promoters. The RTVs were subjected to a 5 day accelerated aging test (1.36 moles) of pyrrolidine. The reaction was carried out from 80°–115° C. in the presence of 2-3 drops of a platinum catalyst as 1.7% by weight platinum in cyclotetramethyltetravinyltetrasiloxane. The reaction is carried out slowly due to foaming and hydrogen evolution. The completion of the reaction was shown by absence of SiH with IR. Excess pyrrolidine was stripped under partial vacuum. There was obtained >60% yield of bis(pyrrolidinyl)tetramethyldisiloxane as a clear colorless liquid which distilled at 82°–83° C. at <1 Torr.

Butylisocyanate (22.6 g, 229 mmoles) was added dropwise over a 2 hour period to 29.3 g, (114 mmoles) of the bis(pyrrolidinyl)tetramethyldisiloxane which was stirring at −10° C. under nitrogen. The reaction mixture was stirred at 0° C. for 8–10 hours.

Based on method of preparation, there was obtained a quantitative yield of bis(ureido)disiloxane coupler as a yellow viscous oil having the following formula:

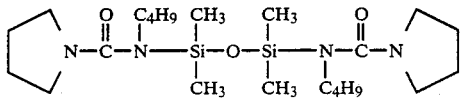

Its identity was confirmed by IR and HNMR. A base mixture was prepared following the same for Example 1, except that 3000 cps silanol polymer and ground calcium carbonate having specific surface area of 6 m$^2$/g and medium particle size distribution of 2 micrometers were employed. The physical properties of RTVs formulated with the above bis(ureido)disiloxane coupler and tri(aminoxy)cyclotetrasiloxane crosslinker are shown in Table 5, where the values shown for the RTV ingredients are in parts, per 100 parts of mixture:

TABLE 5

| RTV | 13 | 14 |
|---|---|---|
| Silanol Polymer (3,000 cps) | 47.84 | 47.85 |
| Ground Calcium Carbonate | 47.84 | 47.85 |
| bis(ureido)-disiloxane coupler | 3.49 | 3.68 |
| aminoxy-crosslinker | .83 | .62 |
| Moles Coupler/Moles Crosslinker | 5.0 | 7.0 |
| Cure Time (50% rel. humidity) | 7 days | 7 days |
| ShoreA | 19 | 9 |
| Tensile (p.s.i.) | 124 | 198 |
| Elongation (percent) | 1043 | 1329 |
| Modulus (tensile (p.s.i) @ 50-100-150% elong.) | 23-31-35 | 22-29-34 |

EXAMPLE 6

A Werner-Pfleiderer twin screw extruder was used to prepare a series of RTV bases comprised of 22,500 cps silanol polymer, a 3000 cps silanol polymer, a ground calcium carbonate which was described in Example 5, and a precipitated calcium carbonate having a BET surface area of 24.9 m$^2$/g and a maximum probability pore diameter of 0.076 micrometers. The RTV base mixtures were loaded into 6 ounce Semco tubes and catalyzed in the manner described by Example 1 with the aminoxy crosslinker and the bis(ureido) coupler of CH$_2$(CH$_2$=CH)Si(N(CH$_3$)C(O)N(CH$_3$)$_2$)$_2$, abbreviated MeViSi(N(Me)C(O)NMe$_2$)$_2$ which is prepared from MeViSiCl$_2$, HNMe$_2$, and MeNCO. The RTV components, application rates at 90 psi (⅛" orifice), and flow values (Boeing flow jig) are tabulated in Table 6.

In Table 6 below the values shown for the RTV ingredients are in parts, per 100 parts of mixture:

TABLE 6

| RTV | 15 | 16 | 17 | 18 | 19 | 20 | 21 | 22 |
|---|---|---|---|---|---|---|---|---|
| 3000 cps Silanol Polymer | 50 | 50 | 50 | 50 | 50 | 50 | 75 | 75 |
| 22,500 cps Silanol Polymer | 50 | 50 | 50 | 50 | 50 | 50 | 25 | 25 |
| Group Calcium Carbonate | 90 | 90 | 70 | 70 | 50 | 50 | 50 | 50 |
| Precipitated Calcium Carbonate | 10 | 10 | 30 | 30 | 50 | 50 | 50 | 50 |
| Bis(ureido)-Coupler | 8.00 | | 8.00 | | 8.00 | | 8.00 | |
| MeViSi(N(Me)C(O)NMe$_2$)$_2$ | | 5.33 | | 5.33 | | 5.33 | | 5.34 |
| Aminoxy-Crosslinker | 1.60 | 1.60 | 1.60 | 1.60 | 1.60 | 1.59 | 1.60 | 1.59 |
| (Moles coupler/100 pbw) × 1000 | 933 | 944 | 934 | 944 | 934 | 945 | 934 | 946 |
| Moles coupler/moles crosslinker | 6.90 | 6.90 | 6.90 | 6.90 | 6.90 | 6.90 | 6.90 | 6.90 |
| App. Rate @ 90 psi (g/min) | 146 | 170 | 53 | 72 | 77 | 64 | 130 | 114 |
| Flow (inches) @ 4 min. | 2.6 | 2.1 | 0.6 | 0.33 | 0.2 | 0.05 | 0.3 | 0.1 |

The above results show that thixotropic silicone elastomers can be formulated with a blend of ground and precipitated calcium carbonates. A comparison of RTVs 15, 17, and 19 which contain identical concentrations of the bis(ureido) coupler and aminoxy crosslinker show flow to be inversely proportional to the loading of precipitated calcium carbonate. Similar results are shown for RTVs 16, 18, and 20 which were catalyzed with MeViSi(N(Me)C(O)NMe$_2$)$_2$. Furthermore, at a fixed ratio of ground calcium carbonate to precipitated calcium carbonate, (RTV 19 versus RTV 21) and (RTV 20 versus RTV 22), a reduction in silanol polymer viscosity gave substantial improvements in application rate with only a subtle increase in flow.

EXAMPLE 7

An equilibration mixture was heated at 90°–100° C. for 5–7 hours consisting of 37.4 g (0.23 moles) of hexamethyldisiloxane, 50 g (0.025 moles) of a silanol terminated methylhydrogensiloxane fluid consisting essentially of an average of about 31 condensed siloxy units consisting of dimethylsiloxy units and methylhydrogensiloxy in about a 1:6 ratio and 7.31 g (0.025 moles) of octamethylcyclotetrasiloxane. An effective amount of a triflic acid equilibration catalyst was used. The reaction was quenched with dry powdered magnesium oxide and the volatiles were vacuum distilled at >1 Torr 50°–60° C. The resulting intermediate was cooled to 0° C. and 68 g (0.766 moles) of diethylhydroxylamine was added dropwise. Excess diethylhydroxylamine was vacuum distilled. Based on method of preparation and $^1$HNMR and $^{29}$SiNMR the product or "linear aminoxy crosslinker" had the average formula,

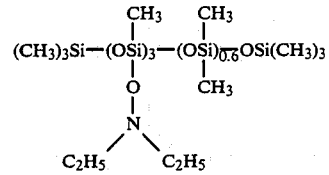

In accordance with the procedure of Example 6, an RTV was prepared using 1.54 g of the above linear aminoxy crosslinker 5.469 g of bis(1,1-dimethyl-3-butylureido)methylvinylsilane coupler, 93.3 g of a silanol terminated polydimethylsiloxane base polymer, consisting of a mixture of 75% by weight of a polydimethylsiloxane fluid having about a 22,000 centipoise viscosity and 25% by weight of a polydimethylsiloxane fluid having about an 8000 centipoise viscosity, 63.7 g of ground calcium carbonate and 9.33 g of the precipitated calcium carbonate. There was obtained a thixotropic silicone elastomer, having a ShoreA of 16, a tensile (psi) of 161, and an elongation of 1700%.

Although the above examples are directed to only a few of the very many variables which can be used in the practice of the present invention to make the room temperature vulcanizable organopolysiloxane compositions, it should be understood that the present invention is directed to a much broader variety of such RTV compositions based on the use of a much broader variety of bis(ureido) couplers, aminoxy crosslinkers, silanol-terminated polydiorganosiloxanes and calcium carbonate filler, as set forth in a description preceding these examples.

What is claimed is:

1. Solventless, moisture curable, room temperature vulcanizable organopolysiloxane compositions, comprising by
   (A) 100 parts of a silanol-terminated polydiorganosiloxane,
   (B) 2.5 to 25 parts, of a bis(ureido)diorganosilicon coupler selected from the class consisting of diorganosilanes and ureido-chain-stopped polydiorganosiloxanes having an average of from 1 to 10 condensed diorganosiloxy units,
   (C) 0.25 to 10 parts of an aminoxyorganosiloxane cross-linker selected from the class consisting of a cyclic siloxane, linear siloxane, and mixture thereof, having from 2 to about 100 silicon atoms substituted with $C_{(1-13)}$ monovalent organic radicals and from 3 to about 10-OY radicals attached to silicon by silicon-oxygen linkages, where there are less than 3-OY radicals per silicon from the class consisting of $N(R)_2$ and a heterocyclic amine, and R is selected from the same or different $C_{(1=13)}$ monovalent organic radicals, and
   (D) up to 400 parts of a non-siliceous filler comprising a mixture of ground calcium carbonate and 10% to 100% by weight thereof of precipitated calcium carbonate.

2. A composition in accordance with claim 1, where the silanol-terminated polydiorganosiloxane is a silanol-terminated polydimethylsiloxane.

3. A composition in accordance with claim 1, where the bis(ureido)organosilicon coupler is bis(1,1-N,N-tetramethylene-N'-butylureido)methylvinylsilane.

4. A composition in accordance with claim 1, where the bis(ureido)organosilicon coupler is $$CH_3(CH_2=CH)Si-[N(C_4H_9)-C(O)-NC_4H_9]_2$$
with CH$_3$ on Si.

5. A composition in accordance with claim 1, where the bis(ureido) organosilicon coupler is $$CH_3(CH_2=CH)Si-[N(CH_3)-C(O)-NC_4H_9]_2$$
with CH$_3$ on Si.

6. A composition in accordance with claim 1, where the bis(ureido)organosilicon coupler is $$CH_3(CH_2=CH)Si-[N(CH_3)-C(O)-N(CH_3)_2]_2.$$

7. A composition in accordance with claim 1, where the bis(ureido)organosilicon coupler is bis(1,1-N,N-tetramethylene-N'-butylureido)-dimethylsilane.

8. A composition in accordance with claim 1, where the bis(ureido)organosilicon coupler is $$\text{cyclo-}N-C(O)-N(C_4H_9)-Si(CH_3)_2-O-Si(CH_3)_2-N(C_4H_9)-C(O)-N\text{-cyclo}$$

9. A composition in accordance with claim 1, where the bis(ureido)organosilicon coupler is a polydimethylsiloxane having up to 10 condensed dimethylsiloxy units having terminal dialkylureido groups.

10. A composition in accordance with claim 1, where the bis(ureido)diorganosilicon coupler is bis(1,1-N,N-dimethyl-N'-methylureido)dimethylsilane.

11. A composition in accordance with claim 1, where the bis(ureido)diorganosilicon coupler is bis(1,1-N,N-dimethyl-N'-butylureido)dimethylsilane.

12. A composition in accordance with claim 1, where the bis(ureido)diorganosilicon coupler is bis(1,1-N,N-dimethyl-N'-butylureido)methylvinylsilane.

13. A composition in accordance with claim 1, where the bis(ureido)diorganosilicon coupler is bis(1,1-N,N-dimethyl-N'-cyclohexylureido)dimethylsilane.

14. A composition in accordance with claim 1, where the bis(ureido)diorganosilicon coupler is bis(1,1-N,N-dimethyl-N'-cyclohexylureido)methylvinylsilane.

15. A composition in accordance with claim 1, where the bis(ureido)diorganosilicon coupler is bis(1,1-N,N-dimethyl-N'-phenylureido)dimethylsilane.

16. A composition in accordance with claim 1, where the bis(ureido)diorganosilicon coupler is bis(1,1-N,N-dimethyl-N'-phenylureido)methylvinylsilane.

17. A composition in accordance with claim 1, where the aminoxyorganosiloxane cross-linker is 1-butyl-3,5,7-tris-(diethylhydroxylamino)-1,3,5,7-tetramethylcyclotetrasiloxane.

18. A composition in accordance with claim 1, utilizing 5 to 200 parts of the non-siliceous filler.

19. A composition in accordance with claim 1, where the non-siliceous filler comprises precipitated calcium carbonate.

20. A composition in accordance with claim 1, where the aminoxyorganosiloxane is a linear aminoxy-cross-linker.

21. A solventless, moisture curable, room temperature vulcanizable organopolysiloxane composition comprising by weight,
   (A) 100 parts of a silanol-terminated polydimethylsiloxane with viscosity in the range of from 1,000 to 75,000 centipoise at 25° C.,
   (B) 2.5 to 15 parts of $$CH_3(CH=CH_2)Si[N(C_4H_9)C(O)N(CH_3)_2]_2$$

(C) 0.25 to 7 parts of a linear aminoxyorganosiloxane cross-linker having from 3 to 50 silicon atoms substituted with $CH_3$ radicals and from 3 to about 10 $ON(CH_2CH_3)_2$ radicals attached to silicon by silicon-oxygen linkages,
   (D) 50 to 150 parts of a mixture of ground $CaCO_3$ and 10 to 100% by weight thereof of precipitated calcium carbonate with a BET surface area of 10 to 400 m²/g and maximum probability pore size of about 0.01 to 1 micrometer.

* * * * *